United States Patent
Tamai

(10) Patent No.: US 10,621,455 B2
(45) Date of Patent: Apr. 14, 2020

(54) IMAGE PROCESSING SYSTEM, INFORMATION PROCESSING DEVICE, INFORMATION PROCESSING METHOD, AND INFORMATION PROCESSING PROGRAM

(71) Applicant: OMRON Corporation, Kyoto-shi, Kyoto (JP)

(72) Inventor: Toshinori Tamai, Nara (JP)

(73) Assignee: OMRON Corporation, Kyoto-shi (JP)

( * ) Notice: Subject to any disclaimer, the term of this patent is extended or adjusted under 35 U.S.C. 154(b) by 189 days.

(21) Appl. No.: 15/785,600

(22) Filed: Oct. 17, 2017

(65) Prior Publication Data

US 2018/0218231 A1    Aug. 2, 2018

(30) Foreign Application Priority Data

Jan. 30, 2017 (JP) .................................. 2017-013910

(51) Int. Cl.
| | |
|---|---|
| *G06K 9/00* | (2006.01) |
| *G06K 9/62* | (2006.01) |
| *G06K 9/20* | (2006.01) |
| *G06F 3/0482* | (2013.01) |
| *G06F 3/0484* | (2013.01) |

(52) U.S. Cl.
CPC ..... *G06K 9/00993* (2013.01); *G06K 9/00973* (2013.01); *G06K 9/2081* (2013.01); *G06K 9/6253* (2013.01); *G06F 3/0482* (2013.01); *G06F 3/04842* (2013.01); *G06K 2209/01* (2013.01); *G06K 2209/19* (2013.01); *G06K 2209/21* (2013.01)

(58) Field of Classification Search
CPC ........... G06T 7/001; G06T 2207/20021; G06T 7/0004; G06T 7/0002
USPC ....... 382/103, 141, 143, 145, 149, 151, 170, 382/209, 278, 282; 348/86, 125, 126
See application file for complete search history.

(56) References Cited

U.S. PATENT DOCUMENTS

| | | | | |
|---|---|---|---|---|
| 5,875,004 A | * | 2/1999 | Yamane | G06T 7/0002 348/705 |
| 7,127,126 B2 | * | 10/2006 | Sakai | G01N 21/95607 382/294 |
| 7,366,343 B2 | * | 4/2008 | Takeuchi | G01N 21/95607 348/87 |

(Continued)

FOREIGN PATENT DOCUMENTS

JP    2014-203309 A    10/2014

*Primary Examiner* — Yosef Kassa
(74) *Attorney, Agent, or Firm* — Metrolex IP Law Group, PLLC

(57) ABSTRACT

An image processing system includes a central processing unit (CPU), a field programmable gate array (FPGA), a storage in which a library including plural pieces of image processing executed by the CPU or the FPGA is stored, an operation unit configured to receive an operation to select at least one pieces of image processing from the library and an operation to designate execution order for each piece of selection target image processing selected by the selection operation; and a display configured to display each piece of selection target image processing in the execution order. The operation unit further receives an operation to designate one of the CPU and the FPGA as an execution subject for each piece of selection target image processing displayed on the display.

13 Claims, 15 Drawing Sheets

(56) References Cited

U.S. PATENT DOCUMENTS

| | | | |
|---|---|---|---|
| 7,421,109 B2* | 9/2008 | Tsuchiya | G06T 7/0004 348/130 |
| 7,424,146 B2* | 9/2008 | Honda | G06T 7/0004 348/125 |
| 7,487,992 B2* | 2/2009 | Pascal | A63C 10/04 280/619 |
| 8,036,447 B2* | 10/2011 | Hayakawa | G06T 7/001 382/141 |
| 8,041,103 B2* | 10/2011 | Kulkarni | G06F 17/5045 382/144 |
| 8,139,843 B2* | 3/2012 | Kulkarni | H01L 21/67005 382/144 |
| 8,330,281 B2* | 12/2012 | Ghinovker | G03F 7/70633 257/797 |
| 8,853,628 B2* | 10/2014 | Hosoya | G06T 7/001 250/306 |
| 2014/0304637 A1 | 10/2014 | Ijiri et al. | |

* cited by examiner

FIG. 15

Simulation result

Candidate 1 — 111

Select execution subject — 112

| No | Item | Execution subject |
|---|---|---|
| 0 | Smoothing | FPGA ▷ |
| 1 | Contraction | FPGA ▷ |
| 2 | Expansion | FPGA ▷ |
| 3 | Background cut | CPU ▷ |

113

| Similarity | 60 |
|---|---|
| Stability | 20 |
| Execution time [ms] | 30 |

Select candidate — 117

| Candidate 3 ▷ |
|---|
| Candidate 1 |
| Candidate 2 |
| Candidate 3 |

Candidate 2 — 111C

Priority: execution speed — 112C

| No | Item | Execution subject |
|---|---|---|
| 0 | Contraction | FPGA |
| 1 | Expansion | FPGA |
| 2 | Background cut | FPGA |
| 3 | Smoothing | CPU |
| 4 | | |

113C

| Similarity | 60 |
|---|---|
| Stability | 20 |
| Execution time [ms] | 20 |

Candidate 3 — 111D

Priority: Similarity — 112D

| No | Item | Execution subject |
|---|---|---|
| 0 | Contraction | FPGA |
| 1 | Expansion | FPGA |
| 2 | Smoothing | FPGA |
| 3 | Background cut | CPU |
| 4 | | |

113D

| Similarity | 70 |
|---|---|
| Stability | 20 |
| Execution time [ms] | 40 |

OK — 118     Cancel — 119

140(105)

IMAGE PROCESSING SYSTEM, INFORMATION PROCESSING DEVICE, INFORMATION PROCESSING METHOD, AND INFORMATION PROCESSING PROGRAM

CROSS-REFERENCE TO RELATED APPLICATION

This application is based on Japanese Patent Application No. 2017-013910 filed with the Japan Patent Office on Jan. 30, 2017, the entire contents of which are incorporated herein by reference.

FIELD

The present disclosure relates to a technique of optimizing an execution subject of image processing combined by a user.

BACKGROUND

In a factory automation (FA) field, technique of automatically inspecting a workpiece has been widespread. The workpiece inspection processing is performed by a combination of various pieces of image processing. An application that provides a user interface for setting the combination of the pieces of image processing by the user has been developed.

As to the application, Japanese Patent Application Laid-open No. 2014-203309 discloses an image processing device that can perform more efficient and high-speed image processing using knowledge about specific application image processing owned by a user. In Japanese Patent Application Laid-open No. 2014-203309, the user selects a desired processing item from plural processing items in which different pieces of image processing are defined, and arranges the processing items side by side on the user interface, and each processing item is executed in execution order corresponding to the arrangement order. The user can perform random inspection processing by changing the combination of processing items. Hereinafter, a series of image processing groups performed by the processing items combined by the user is also referred to as a user setting processing flow.

SUMMARY

The user setting processing flow is executed by an image processing device such as an image sensor. Some image processing devices include plural types of control devices such as a central processing unit (CPU) and a field programmable gate array (FPGA). The pieces of image processing included in the user setting processing flow are cooperatively executed by the plural types of control devices, thereby performing high-speed processing. At this point, the optimum execution subject of each piece of image processing varies depending on various factors such as a combination of the pieces of image processing and the execution order of image processing. Therefore, there is a demand for a technology of designating the execution subject with respect to each piece of image processing in the user setting processing flow.

According to a first aspect, an image processing system includes: a first control device; a second control device having a type different from the first control device; a storage in which a library including plural pieces of image processing executed by the first control device or the second control device is stored; an operation unit configured to receive an operation to select at least one piece of image processing from the library and an operation to designate execution order with respect to each piece of selection target image processing selected through the selection operation; and a display configured to display each piece of selection target image processing in the execution order. The operation unit further receives an operation to designate one of the first control device and the second control device as an execution subject with respect to each piece of selection target image processing displayed on the display.

It may be preferable that the library includes a first image processing group that can be executed by the first control device and a second image processing group that can be executed by the second control device, a processing content of the second image processing group being identical to each piece of image processing of the first image processing group.

It may be preferable that the image processing system further includes an estimator configured to estimate an execution time when each piece of selection target image processing is processed with the combination of the execution subjects designated by the operation unit based on execution time information defining an execution time by the first control device or the second control device for each of the plural pieces of image processing, the execution time information being further stored in the storage. The display further displays the execution time estimated by the estimator.

It may be preferable that the estimator estimates the execution time every time the designation of the execution subject is changed. The display updates the display of the execution time in conjunction with the operation to designate the execution subject.

It may be preferable that one of the first control device and the second control device includes an FPGA. The display further displays the number of times of circuit reconfiguration generated in the FPGA when each piece of selection target image processing is executed by the execution subject designated in the execution order.

It may be preferable that the image processing system further includes an optimizer configured to optimize the execution order of each piece of selection target image processing while the combination of the designated execution subjects is maintained.

According to a second aspect, an information processing device configured to be communicable with an image processing device including a first control device and a second control device having a type different from the first control device, the information processing device includes: a storage in which a library including plural pieces of image processing executed by the first control device or the second control device is stored; an operation unit configured to receive an operation to select at least one piece of image processing from the library and an operation to designate execution order with respect to each piece of selection target image processing selected through the selection operation; and a display configured to display each piece of selection target image processing in the execution order. The operation unit further receives an operation to designate one of the first control device and the second control device as an execution subject with respect to each piece of selection target image processing displayed on the display.

According to a third aspect, an information processing method includes the steps of: preparing a library including plural pieces of image processing executed by a first control device or a second control device having a type different from the first control device; receiving an operation to select at least one piece of image processing from the library and an operation to designate execution order with respect to each piece of selection target image processing selected through the selection operation; displaying each piece of selection target image processing in the execution order; and receiving an operation to designate one of the first control device and the second control device as an execution subject with respect to each piece of displayed selection target image processing.

According to a fourth aspect, an information processing program executed by an image processing device, the information processing program causes the image processing device to execute the steps of: preparing a library including plural pieces of image processing executed by a first control device or a second control device having a type different from the first control device; receiving an operation to select at least one piece of image processing from the library and an operation to designate execution order with respect to each piece of selection target image processing selected through the selection operation; displaying each piece of selection target image processing in the execution order; and receiving an operation to designate one of the first control device and the second control device as an execution subject with respect to each piece of displayed selection target image processing.

In a certain aspect, the execution subject for each piece of image processing can be designated in the user setting processing flow.

These and other objects, features, aspects and advantages of the present disclosure will become apparent from the following detailed description of the present invention, taken in conjunction with the accompanying drawings.

BRIEF DESCRIPTION OF THE DRAWINGS

FIG. 15 is a diagram illustrating an example of a user interface that designates an execution subject;

DETAILED DESCRIPTION

Figure 1:
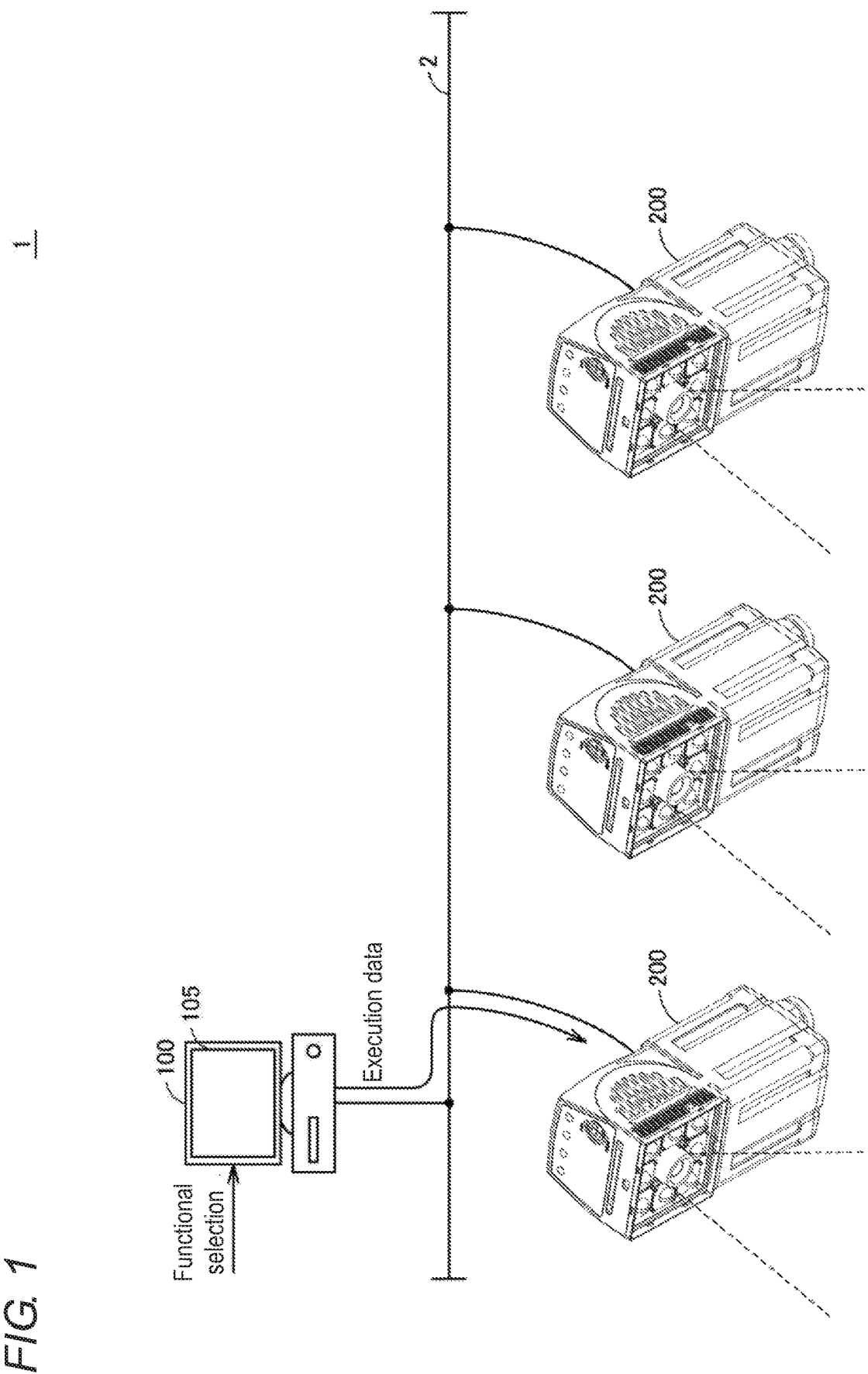
FIG. 1 is a diagram illustrating an example of a system configuration of an image processing system according to a first embodiment.

Hereinafter, embodiments will be described with reference to the drawings. In the following description, the identical part and component are designated by the identical reference numeral. The identical part and component have the identical name and function. Therefore, detailed description will not be repeated. In the following embodiments and modifications may selectively be combined as appropriate.

<First Embodiment>

[A. Outline]

An outline of an image processing system 1 according to a first embodiment will be described with reference to FIGS. 1 to 3. FIG. 1 is a diagram illustrating an example of a system configuration of the image processing system 1 of a first embodiment. The image processing system 1 is typically incorporated in a production line. The image processing system 1 performs processing (hereinafter, also referred to as "measurement processing") such as recognition of characters and inspection of scratches based on an image obtained by imaging an inspection target workpiece conveyed on a production line.

In the example of FIG. 1, the image processing system 1 includes a management device 100 that is an example of an information processing device and at least one image processing device 200 configured to communicate with the management device 100. For example, the workpiece is conveyed in a predetermined direction by a conveyance mechanism such as a belt conveyor, and each image processing device 200 is disposed at a predetermined position relative to a conveyance path.

The image processing device 200 includes an imager, a storage device in which a library including plural functional modules that perform an image processing function is stored, and a processor that processes an image obtained from the imager by performing at least one of the functional module (typically, a program module) Each functional module includes a command code and an execution module, which implement some sort of image processing function in the image processing device 200. A user can perform various pieces of measurement processing by an arbitrary combination of the pieces of image processing included in the library. The image processing device 200 can shorten a processing time by executing the measurement processing in cooperation with plural types of control devices such as CPU and FPGA.

A process of setting a processing flow performing desired measurement processing will be described with reference to FIG. 2. FIG. 2 is a conceptual diagram schematically illustrating an example of a process in which the user sets the processing flow.

In step S1, a library 110 including plural pieces of image processing is displayed in the form of a list on a display of the management device 100. By operating an operation unit such as a keyboard and a mouse, the user performs an operation to select at least one piece of image processing from the library 110 and an operation to designate the execution order of the pieces of selection target image processing selected by the operation. For example, the execution order of the pieces of image processing is designated by the arrangement order of the pieces of selection target image processing.

Figure 2:
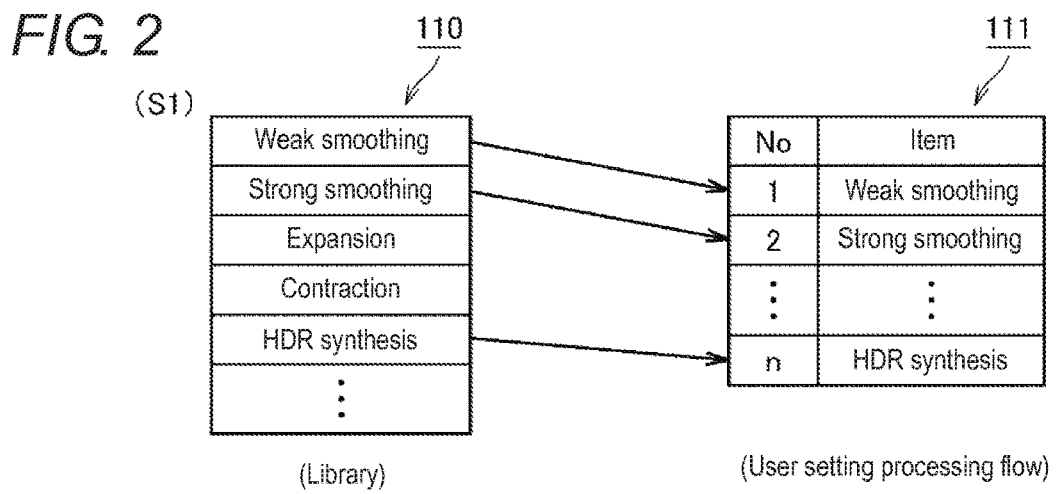
FIG. 2 is a conceptual diagram schematically illustrating an example of a process in which a user sets a processing flow.
Figure 3A:
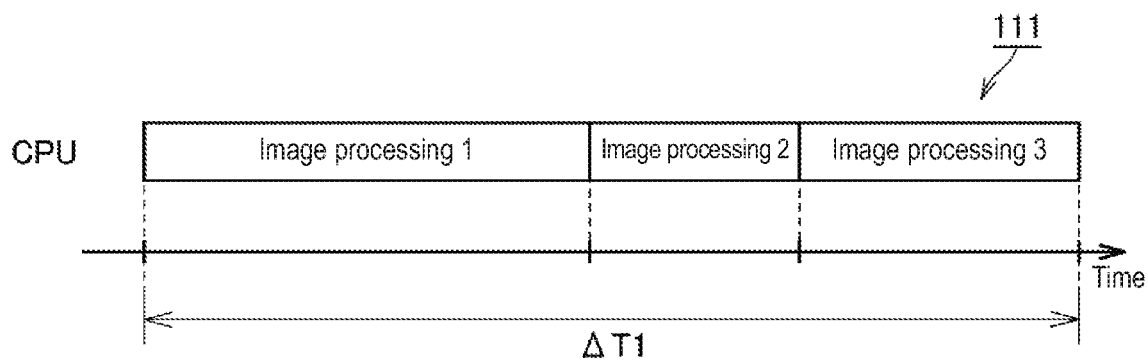
FIG. 3A, FIG. 3B, and FIG. 3C are diagrams each illustrating an execution time of a processing flow executed by an image processing device of a first embodiment.
Figure 3B:
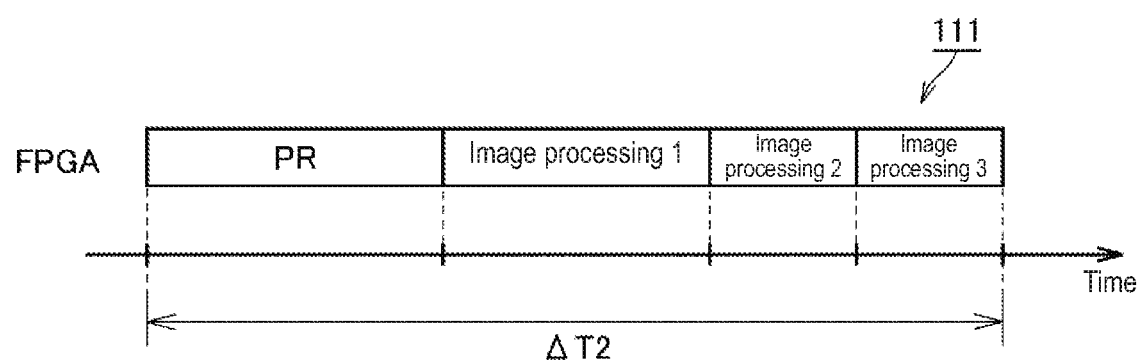
Figure 3C:
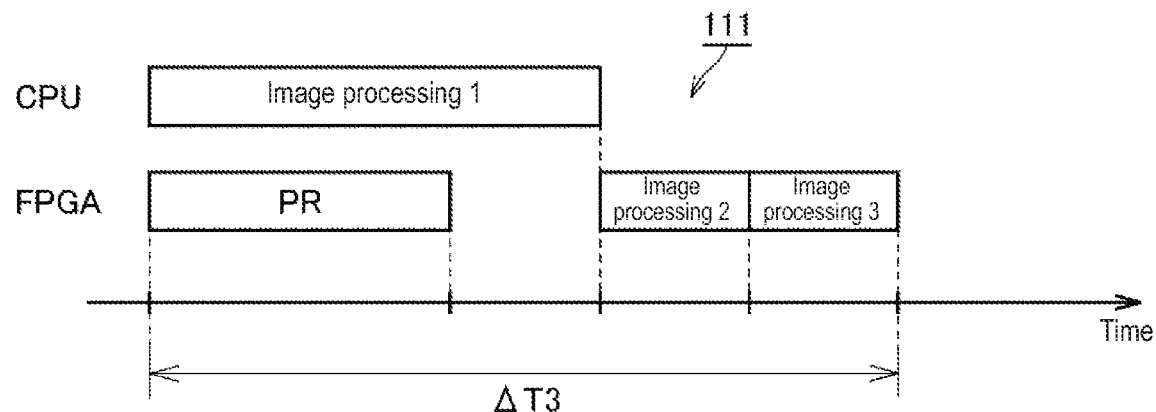

In the example of FIG. 2, a processing flow 111 is set by an image processing group selected from the library 110. FIG. 3A, FIG. 3B and FIG. 3C illustrate the execution time of the processing flow 111.

As illustrated in FIG. 3A, the execution time is $\Delta T1$ when the processing flow 111 is executed only by the CPU of the image processing device 200. As illustrated in FIG. 3B, the execution time is $\Delta T2$ when the processing flow 111 is executed only by the FPGA of the image processing device 200. As illustrated in FIG. 3C, the execution time is $\Delta T3$ ($\Delta T3 < \Delta T1, \Delta T2$) when the processing flow 111 is cooperatively executed by the CPU and the FPGA of the image processing device 200.

Although a processing speed of the FPGA is typically faster than a processing speed of the CPU, some of the FPGAs have a function of dynamically reconfiguring a circuit configuration during processing (what is called partial reconfiguration (PR)). A circuit scale of the FPGA can be virtually expanded by reconfiguring the circuit of the FPGA appropriately. However, when the FPGA is frequently reconfigured, time necessary for the reconfiguration is lengthened, and the execution time of the processing flow 111 may occasionally become longer than expected. The execution time of the processing flow 111 is shortened by the execution of each piece of image processing set by the user in cooperation with the CPU and the FPGA.

An optimum execution subject that executes each piece of image processing included in the processing flow 111 varies depending on various factors such as a combination of the pieces of image processing and the execution order of the pieces of image processing. Therefore, the image processing system 1 of a first embodiment provides an environment in which the execution subject can be designated with respect to each piece of image processing included in the processing flow 111.

More specifically, in step S2, a display 105 of the management device 100 displays a user interface 140 in order to receive an operation to designate one of the CPU (first control device) and FPGA (second control device) as the execution subject with respect to each piece of image processing included in the processing flow 111. An execution subject designation area 112 is displayed in parallel with the processing flow 111. In the example of FIG. 2, in the designation area 112, a select box 112A is represented as an object that receives the designation of the execution subject. The select box 112A is displayed in parallel with a corresponding image processing item in the processing flow 111. When the select box 112A is selected, a menu 112B is expanded. The user can select one of the items represented in the menu 112B.

In step S3, the management device 100 simulates whether the combination of the designated execution subjects is good. As a result, simulation results 113 and 114 are displayed.

For example, the simulation result 113 includes a similarity of the processing flow 111 before and after the designation of the execution subject, a stability indicating a degree of changes in output result before and after the designation of the execution subject, and the execution time necessary for the processing flow 111 by a combination of the designated execution subjects. Preferably the management device 100 updates the simulation result 113 in conjunction with the operation to designate the execution subject in the designation area 112. That is, the simulation result 113 is updated every time the designation of the execution subject is changed. Therefore, the user easily determines whether the combination of the designated execution subjects is good.

For example, the simulation result 114 includes the number of times of circuit reconfiguration occurring in the FPGA of the image processing device 200 when the processing flow 111 is executed by the designated execution subject. The management device 100 increases the number of circuit reconfiguration times with increasing the number of FPGAs set for the processing flow 111. As an example, the management device 100 divides the number of FPGAs set for the processing flow 111 by a predetermined value, thereby calculating the number of circuit reconfiguration. The predetermined value corresponds to the number of set FPGAs in which the reconfiguration of the FPGA is generated.

The simulation result 114 further includes an FPGA remaining amount representing a free resource of the FPGA. In the management device 100, the FPGA remaining amount decreases with increasing the number of FPGAs set for the processing flow 111. As an example, the management device 100 subtracts the number of FPGAs set for the processing flow 111 from a predetermined value, thereby calculating the FPGA remaining amount. The predetermined value corresponds to the number of set FPGAs in which the reconfiguration of the FPGA is generated. When the calculated FPGA remaining amount is less than zero, the FPGA remaining amount is set to zero. Alternatively, the FPGA remaining amount is decremented by a predetermined number (for example, 1) every time the FPGA is set for the processing flow 111, and the FPGA remaining amount is refreshed to the predetermined value every time the FPGA remaining amount is less than zero.

Preferably the management device 100 updates the simulation result 114 in conjunction with the operation to designate the execution subject in the designation area 112. That is, the simulation result 114 is updated every time the designation of the execution subject is changed. Therefore, the user easily determines whether the combination of the designated execution subjects is good.

When the user presses an OK button 118, the management device 100 reflects the combination of the designated execution subjects, and then ends the processing. When the user presses a cancel button 119, the management device 100 ends the processing without reflecting the combination of the designated execution subjects.

In the above description, the CPU and the FPGA are described as an example of the control device of the image processing device 200. However, the control device is not limited to the CPU and the FPGA. For example, the control device of the image processing device 200 may be another piece of hardware such as a digital signal processor (DSP) and a graphics processing unit (GPU).

In the above description, by way of example, the image processing device 200 is configured with the two types of control devices (that is, the CPU and the FPGA). However, the image processing device 200 may be configured with at least three types of control devices.

[B. Entire System Configuration]

Figure 4:
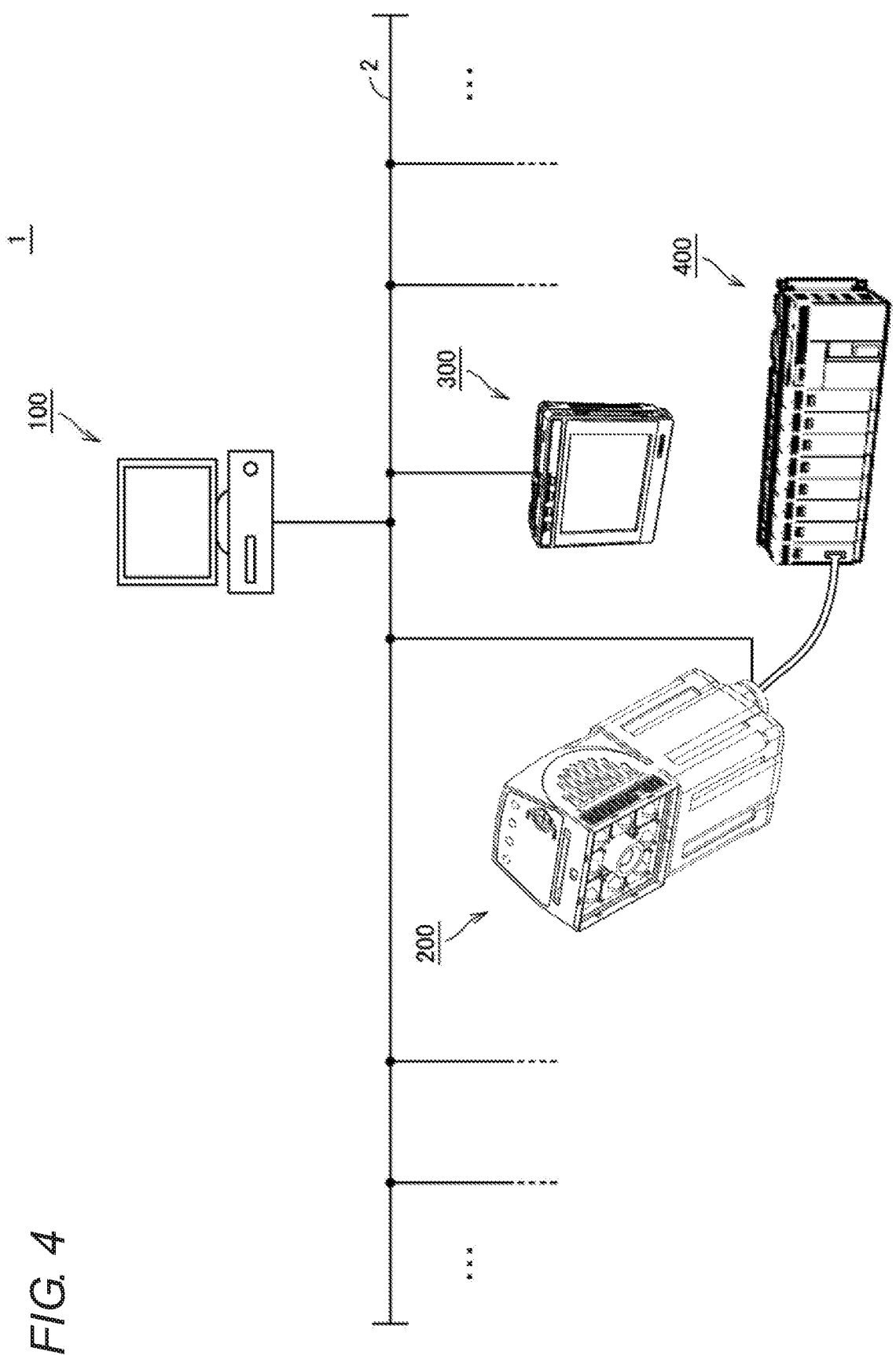
FIG. 4 is a schematic diagram illustrating an entire configuration of an image processing system of a first embodiment.

An entire configuration of the image processing system 1 according to a first embodiment will be described below. FIG. 4 is a schematic diagram illustrating an entire configuration of the image processing system 1. With reference to FIG. 4, the image processing system 1 includes the management device 100 and the at least one image processing device 200 and at least one display setting unit 300, which are connected to the management device 100 through a network 2. A programmable logic controller (PLC) 400 is connected to the image processing device 200.

For example, the display setting unit 300 displays setting of a parameter of the image processing executed on the image processing device 200 and an inspection result obtained by the execution of the image processing in the image processing device 200.

The PLC 400 exchanges timing signals and result information with the image processing device 200. The PLC 400 can also perform entire control of the image processing system 1 by receiving a signal from another device or transmitting a signal to another device.

The PLC 400 may be connected to the image processing device 200 through the network 2, and the display setting unit 300 may directly be connected to the image processing device 200.

In the image processing system 1 of FIG. 4, in response to a trigger signal from the PLC 400, each of the image processing devices 200 takes an image of a subject in a visual field range, and processes the obtained image, thereby executing the measurement processing. This measurement processing may be repeated at a predetermined period, or executed in an event manner in response to the trigger signal from the PLC 400. The image processing executed by the image processing device 200 can be appropriately replaced as described above. Therefore, as illustrated in FIG. 1, when the plural image processing devices 200 are arranged in the same production line, each image processing device 200 may perform different image processing on the same inspection target, and output the measurement result.

[C. Functional Configuration of Management Device 100]

Figure 5:
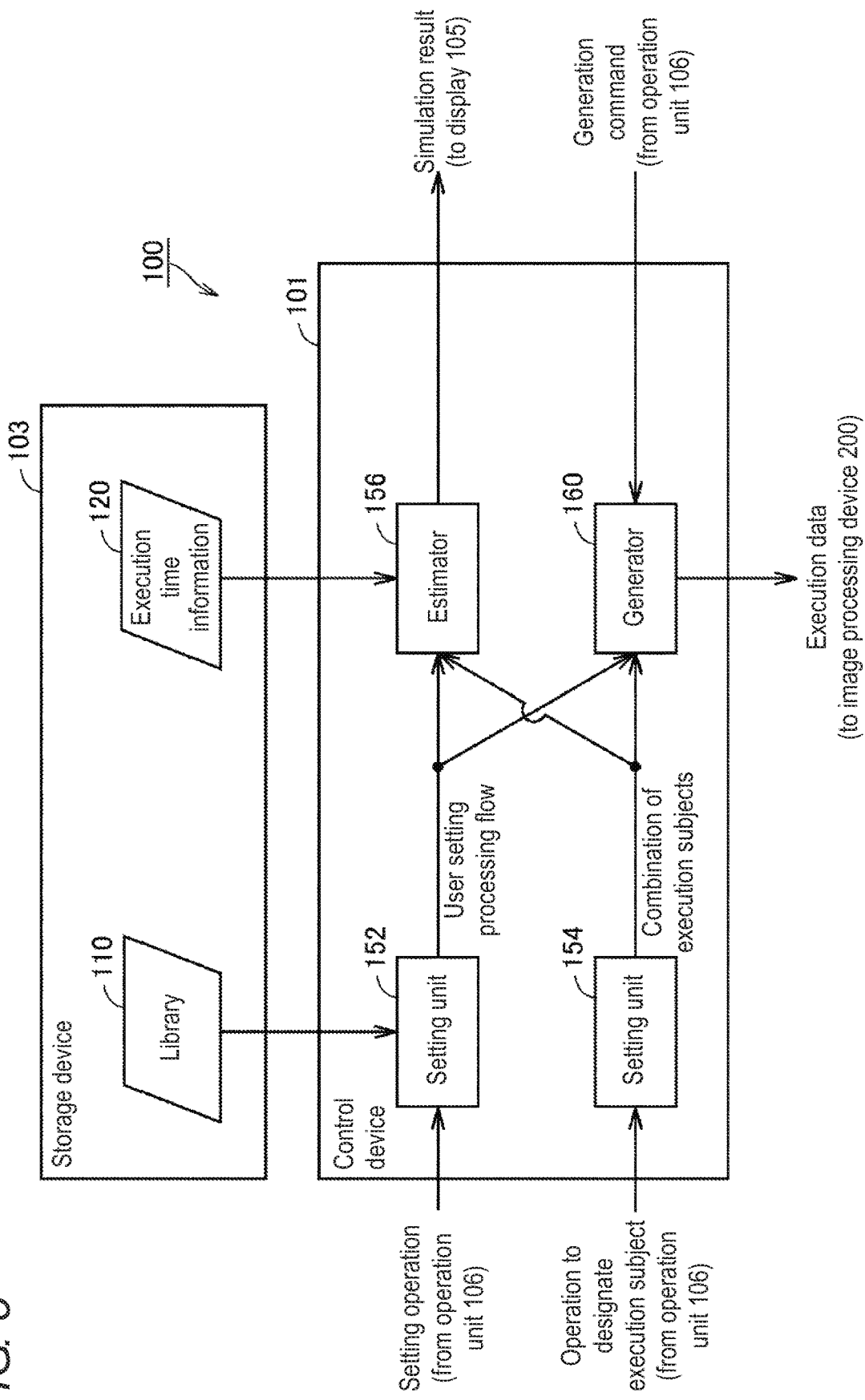
FIG. 5 is a diagram illustrating an example of a functional configuration of a management device of a first embodiment.

A function of the management device 100 will be described with reference to FIGS. 5 to 9. FIG. 5 is a diagram illustrating an example of a functional configuration of the management device 100.

As illustrated in FIG. 5, the management device 100 includes a control device 101 and a storage device 103 as a main hardware configuration. The control device 101 includes setting units 152 and 154, an estimator 156, and a generator 160 as a functional configuration. In the following, the functional configurations will be described below in order.

(C1. Setting Unit 152)

Figure 6:
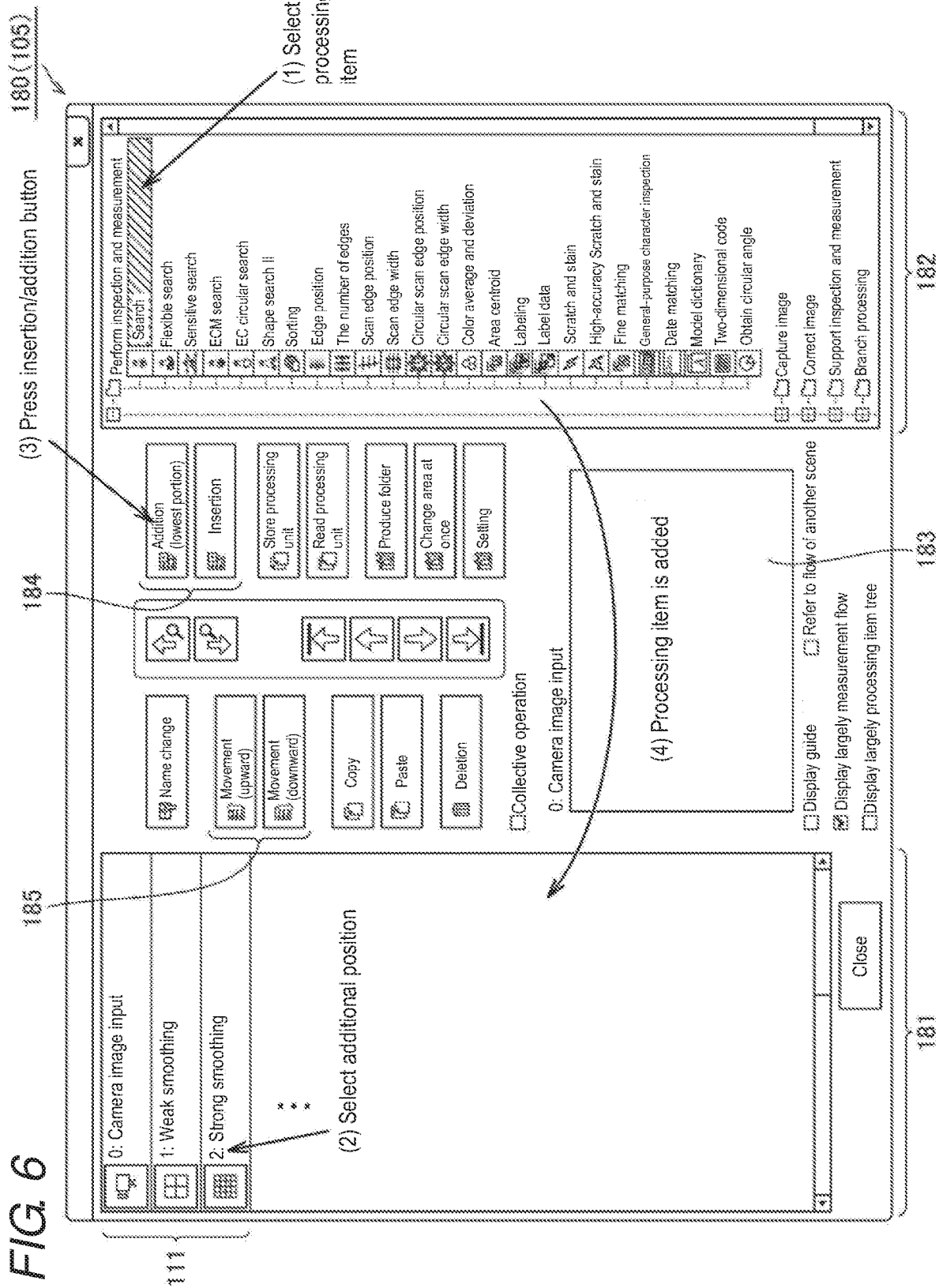
FIG. 6 is a diagram illustrating a user interface provided by a setting unit.

The setting unit 152 provides a user interface that receives an operation to select at least one piece of image processing from a previously-prepared library including plural pieces of image processing and an operation to designate the execution order with respect to each piece of selection target image processing selected by the operation. FIG. 6 is a diagram illustrating a user interface 180 provided by the setting unit 152.

For example, the user interface 180 is displayed on the display 105 of the management device 100. The user interface 180 includes a set item display area 181, a processing item selection area 182, a camera image display area 183, a processing item insertion/addition button 184, and an execution order replacement button 185. A content of the currently-set processing setting is graphically displayed in the set item display area 181. A list of icons indicating a selectable processing item is displayed together with their names in the processing item selection area 182.

In the processing item selection area 182 of the user interface 180, the user selects a processing item necessary for the target image processing ((1) the processing item is selected), and selects a position (order) to which the processing item selected in the set item display area 181 should be added ((2) additional position). When the user selects the processing item insertion/addition button 184 ((3) the insertion/addition button is pressed), the processing item is added ((4) the processing item is added). The content of the processing setting after the addition of the processing item is reflected in the set item display area 181.

By repeating the process as appropriate, the user produces a processing flow performing the target measurement processing. The user selects the processing item in the set item display area 181, and selects the execution order using the execution order replacement button 185 during or after the production of the processing setting, which allows the user to change the execution order as appropriate.

Figure 7:
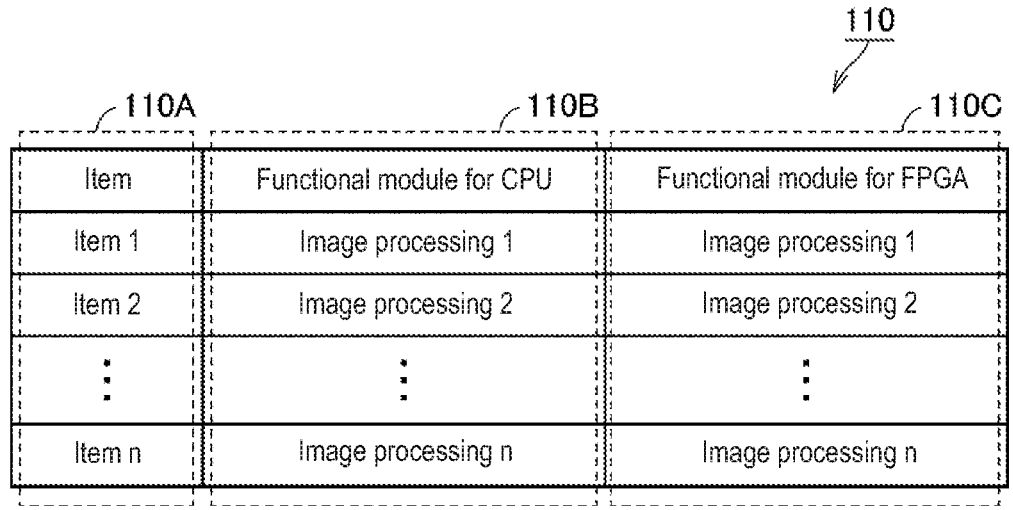
FIG. 7 is a diagram illustrating an example of a data structure of a library.

The setting unit 152 displays the image processing included in the library 110 in the processing item selection area 182 as a selectable processing item. The library 110 will be described with reference to FIG. 7. FIG. 7 is a diagram illustrating an example of a data structure of the library 110.

As illustrated in FIG. 7, the library 110 includes an item group 110A identifying each piece of image processing, an image processing group 110B (first image processing group) that can be executed by the CPU of the image processing device 200, and an image processing group 110C (second image processing group) that can be executed by the FPGA of the image processing device 200. The image processing group 110B and the image processing group 110C have the same processing content. As used herein, the same processing content means processing in which a result obtained for a predetermined input become the same or substantially the same. Because the same or the substantially same image processing is prepared for each of the CPU and the FPGA, each piece of image processing included in the library 110 can be executed by either the CPU or the FPGA.

For example, the image processing groups 110B and 110C are a function module (typically, a program module). Each functional module includes a command code and an execution module, which implement the image processing.

(C2. Setting Unit 154)

The setting unit 154 provides the user interface 140 that receives the designation of the execution subject with respect to each piece of image processing included in the user setting processing flow. Because the user interface 140 is described above with reference to FIG. 2, the description will not be repeated.

The setting unit 154 outputs the combination of the execution subjects set by the user interface 140 to the estimator 156 and the generator 160.

The user interface 140 provided by the setting unit 154 may be configured integrally with the user interface 180 provided by the setting unit 152, or configured separately.

(C3. Estimator 156)

Figure 8:
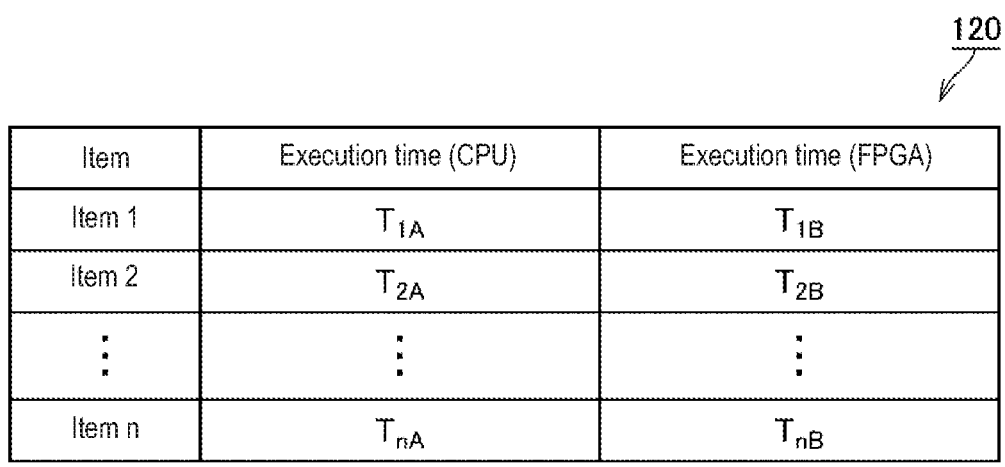
FIG. 8 is a diagram illustrating an example of a data structure of execution time information.

With reference to FIG. 5, the estimator 156 estimates the execution time in the case that the user setting processing flow 111 is processed by the combination of the execution subjects designated by the user interface 140. For example, the execution time is estimated based on execution time information 120 in FIG. 8. FIG. 8 is a diagram illustrating an example of the data structure of the execution time information 120.

As illustrated in FIG. 8, the execution time information 120 defines the execution time of each piece of image processing defined in the library 110 (see FIG. 7) in each type of control device of the image processing device 200. The execution time of each piece of image processing by the CPU and the execution time of each piece of image processing by the FPGA are defined in the example of FIG. 8. Each execution time defined in the execution time information 120 is previously obtained by an experiment or a simulation.

The estimator 156 specifies an item group corresponding to each piece of image processing included in the user setting processing flow 111 from the item groups defined in the execution time information 120. Then, the estimator 156 integrates the execution time correlated with the specified item group and correlated with the designated execution subject. The calculated execution time is displayed on the display 105 of the management device 100 as a simulation result. The processing time necessary for the estimation processing is shortened because the estimator 156 can estimate the execution time of the processing flow 111 without executing the processing flow 111.

In the above description, by way of example, the execution time of the processing flow 111 is estimated based on the execution time information 120. Alternatively, the execution time may be estimated by another method. As an example, the estimator 156 may measure the execution time of the processing flow 111 by actually executing the processing flow 111 with a combination of designated execution subjects. Therefore, the execution time of the processing flow 111 is measured more accurately.

(C4. Generator 160)

Figure 9:
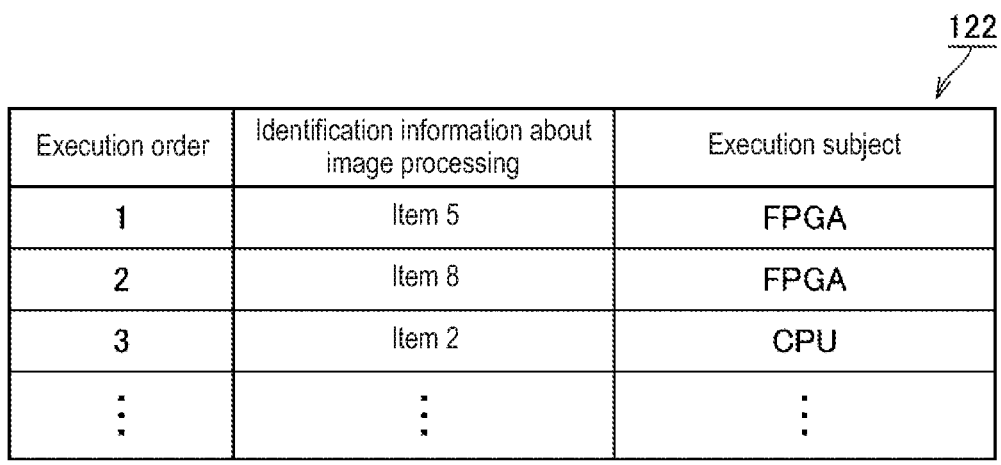
FIG. 9 is a diagram illustrating an example of a data structure of execution data.

The generator 160 generates execution data 122 in FIG. 9. FIG. 9 is a diagram illustrating an example of the data structure of the execution data 122.

The execution data 122 defines the execution order of each piece of image processing included in the processing flow 111, identification information (such as an item name and an image processing ID) about each piece of image processing, and the execution subject of each piece of image processing. The execution data 122 generated by the generator 160 is transmitted to the designated image processing device 200.

Upon receiving the execution data 122 from the management device 100, the image processing device 200 stores the execution data 122. The image processing device 200 refers to the stored execution data 122 based on the reception of an instruction to execute the measurement processing, and executes the processing flow 111 with the combination of the execution subjects defined in the execution data 122. More specifically, the image processing device 200 previously stores a whole or a part of the library installed in the management device 100, and sequentially reads the necessary functional module from the library according to the identification information about the image processing defined in the execution data 122 and the execution order. At this point, the image processing device 200 sequentially switches the execution subjects of the functional modules according to the combination of the execution subjects defined in the execution data 122.

[D. Control Structure of Image Processing System 1]

A control structure of the image processing system 1 will be described with reference to FIGS. 10 and 11.

Figure 10:
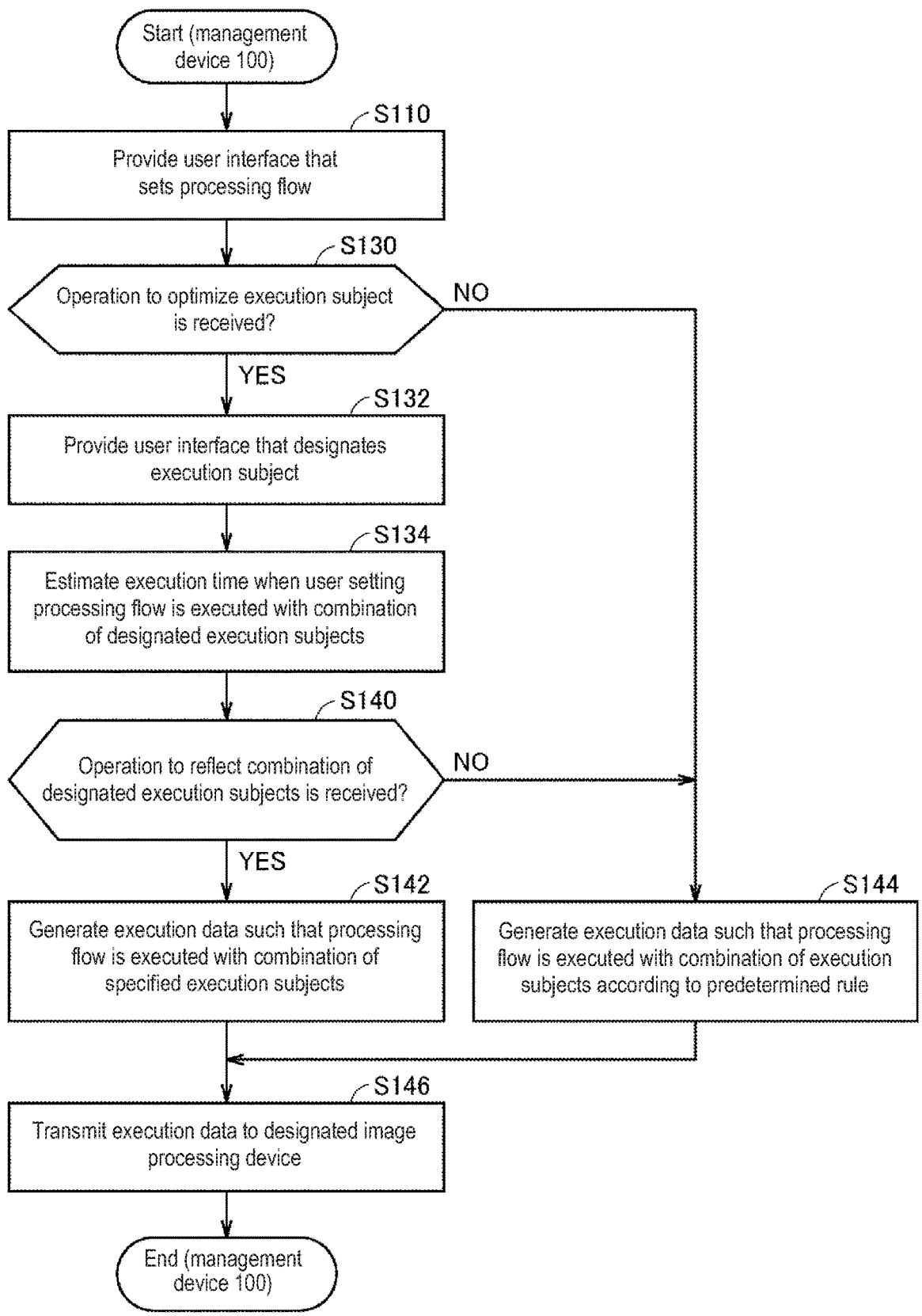
FIG. 10 is a flowchart illustrating a part of processing executed by a management device of a first embodiment.

FIG. 10 is a flowchart illustrating a part of processing executed by the management device 100. The control device 101 (see FIG. 5) of the management device 100 executes a program, thereby performing the processing in FIG. 10. In another aspect, a part or a whole of the processing may be performed by a circuit element or another piece of hardware.

Figure 11:
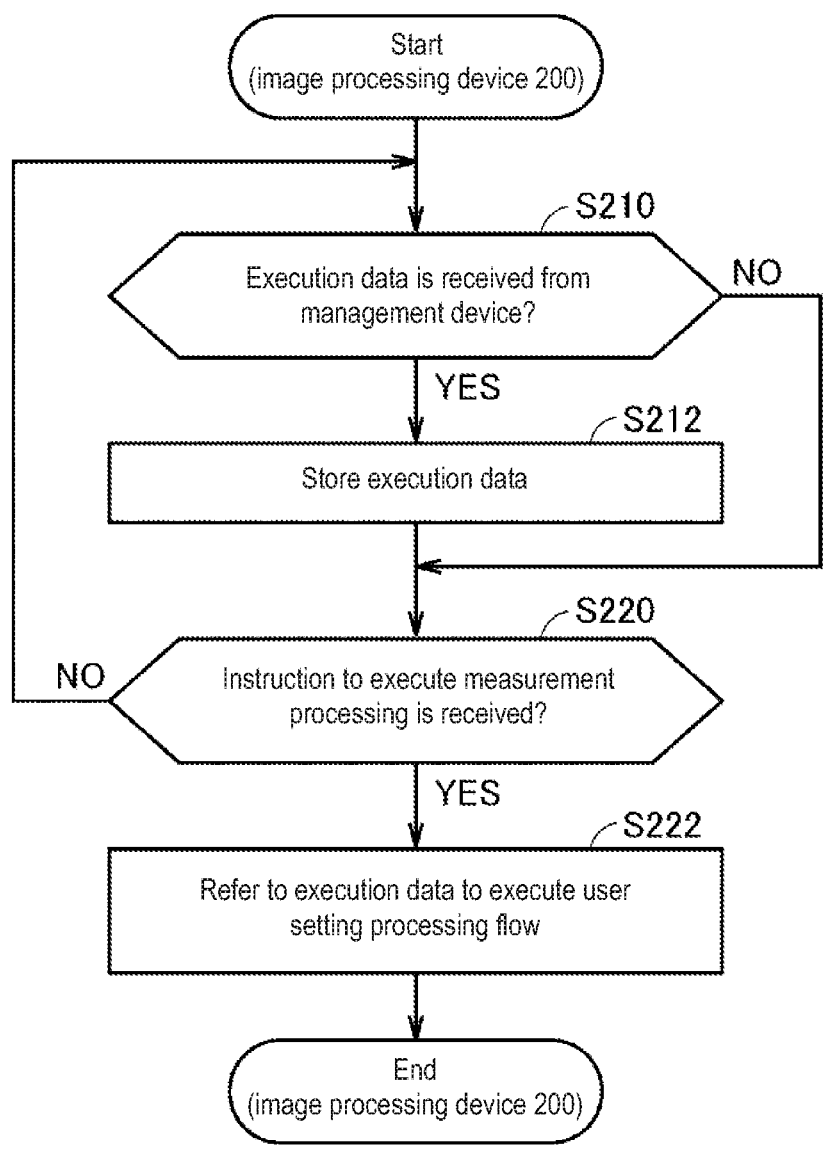
FIG. 11 is a flowchart illustrating a part of processing executed by an image processing device of a first embodiment.

FIG. 11 is a flowchart illustrating a part of the processing executed by the image processing device 200. A control device 220 (see FIG. 13) of the image processing device 200 executes a program, thereby performing the processing in FIG. 11. In another aspect, a part or a whole of the processing may be performed by a circuit element or another piece of hardware.

The processing flows in FIGS. 10 and 11 will be described below in order.

(D1. Control Structure of Management Device 100)

In step S110, the control device 101 provides the user interface 180 (see FIG. 6) in order to set the processing flow as the setting unit 152 (see FIG. 5). The user interface 180 receives an operation to select at least one piece of image processing from the library and an operation to designate the execution order with respect to each piece of selection target image processing selected by the operation. For example, an operation unit 106 (see FIG. 12) receives these operations. Any processing flow is set by repeating the operation to select the image processing and the operation to designate the execution order.

In step S130, the control device 101 determines whether an operation to optimize the execution subject is received with respect to the user setting processing flow. For example, the operation to optimize the execution subject is performed by a press of a predetermined button for switching to an optimization mode on the user interface 180. When determining that the operation is accepted (YES in step S130), the control device 101 switches the control to step S132. Otherwise (NO in step S130), the control device 101 switches the control to step S144.

In step S132, the control device 101 provides the user interface 140 (see FIG. 2) that designates the execution subject with respect to each piece of image processing included in the user setting processing flow as the setting unit 154 (see FIG. 5). For example, the operation unit 106 (see FIG. 12) receives the operation performed on the user interface 140

In step S134, the control device 101 estimates the execution time in the case that the user setting processing flow is executed with the combination of the execution subjects designated in step S132 as the estimator 156 (see FIG. 5). Because the estimation method is described above with reference to FIG. 8, the description will not be repeated.

In step S140, the control device 101 determines whether an operation to reflect the combination of the execution subjects specified in step S134 is accepted. For example, the operation to reflect the combination of the execution subjects is received by an operation to press the OK button 118 in FIG. 2. When determining that the operation to reflect the combination of the execution subjects specified in step S134 is received (YES in step S140), the control device 101 switches the control to step S142. Otherwise (NO in step S140), the control device 101 switches the control to step S144.

In step S142, the control device 101 generates the execution data 122 (see FIG. 9) such that the user setting processing flow is executed with the combination of the execution subjects specified in step S134 as the generator 160 (see FIG. 5).

In step S144, the control device 101 decides a combination of execution subjects of the user setting processing flow according to a predetermined rule, and generates the execution data 122 such that the user setting processing flow is executed with the combination of the execution subjects.

(D2. Control Structure of Image Processing Device 200)

A control structure of the image processing device 200 will be described below with reference to FIG. 11.

In step S210, the control device 220 determines whether the execution data 122 (see FIG. 9) is received from the management device 100. When determining that the execution data 122 is accepted from the management device 100 (YES in step S210), the control device 220 switches the control to step S212. Otherwise (NO in step S210), the control device 220 switches the control to step S220.

In step S212, the control device 220 stores the execution data 122 received from the management device 100 in step S210 in a storage device 222 (see FIG. 13) of the image processing device 200.

In step S220, the control device 220 determines whether an instruction to execute the measurement processing is received. The instruction is issued in timing the imager of the image processing device 200 executes processing of imaging the workpiece. When determining that the instruction to execute the measurement processing is received (YES in step S220), the control device 220 switches the control to step S222. Otherwise (NO in step S220), the control device 220 returns the control to step S210.

In step S222, the control device 220 refers to the execution data 122 stored in step S212, and executes the processing flow 111 with the combination of execution subjects defined in the execution data 122. More specifically, the control device 220 previously stores a whole or a part of the library installed in the management device 100, and sequentially reads the necessary functional module from the library according to the identification information about the image processing defined in the execution data 122 and the execution order. At this point, the control device 220 sequentially switches the execution subjects of the functional modules according to the combination of the execution subjects defined in the execution data 122.

[E. Device Configuration of Image Processing System 1]

Figure 12:
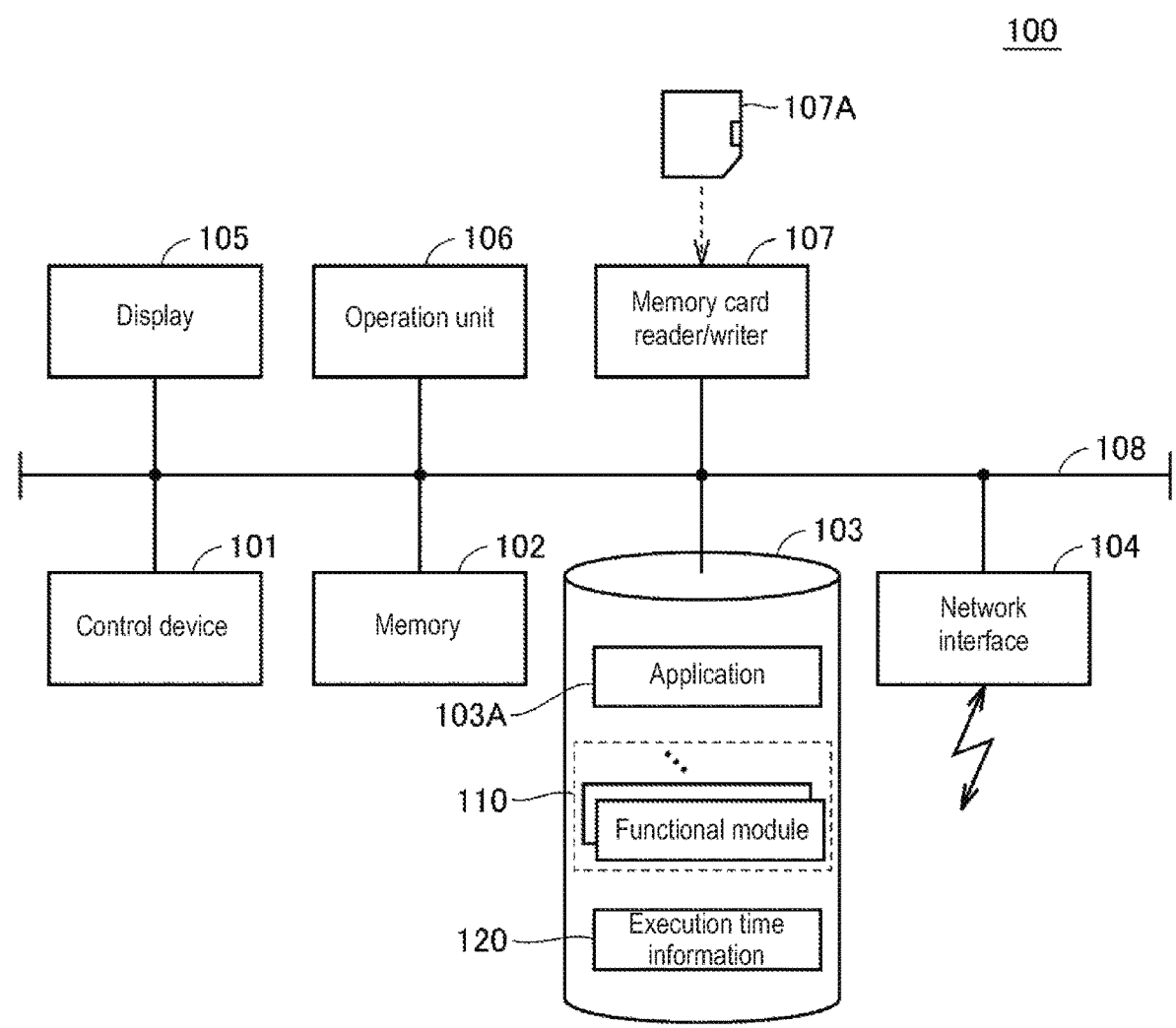
FIG. 12 is a block diagram illustrating a main hardware configuration of a management device of a first embodiment.
Figure 13:
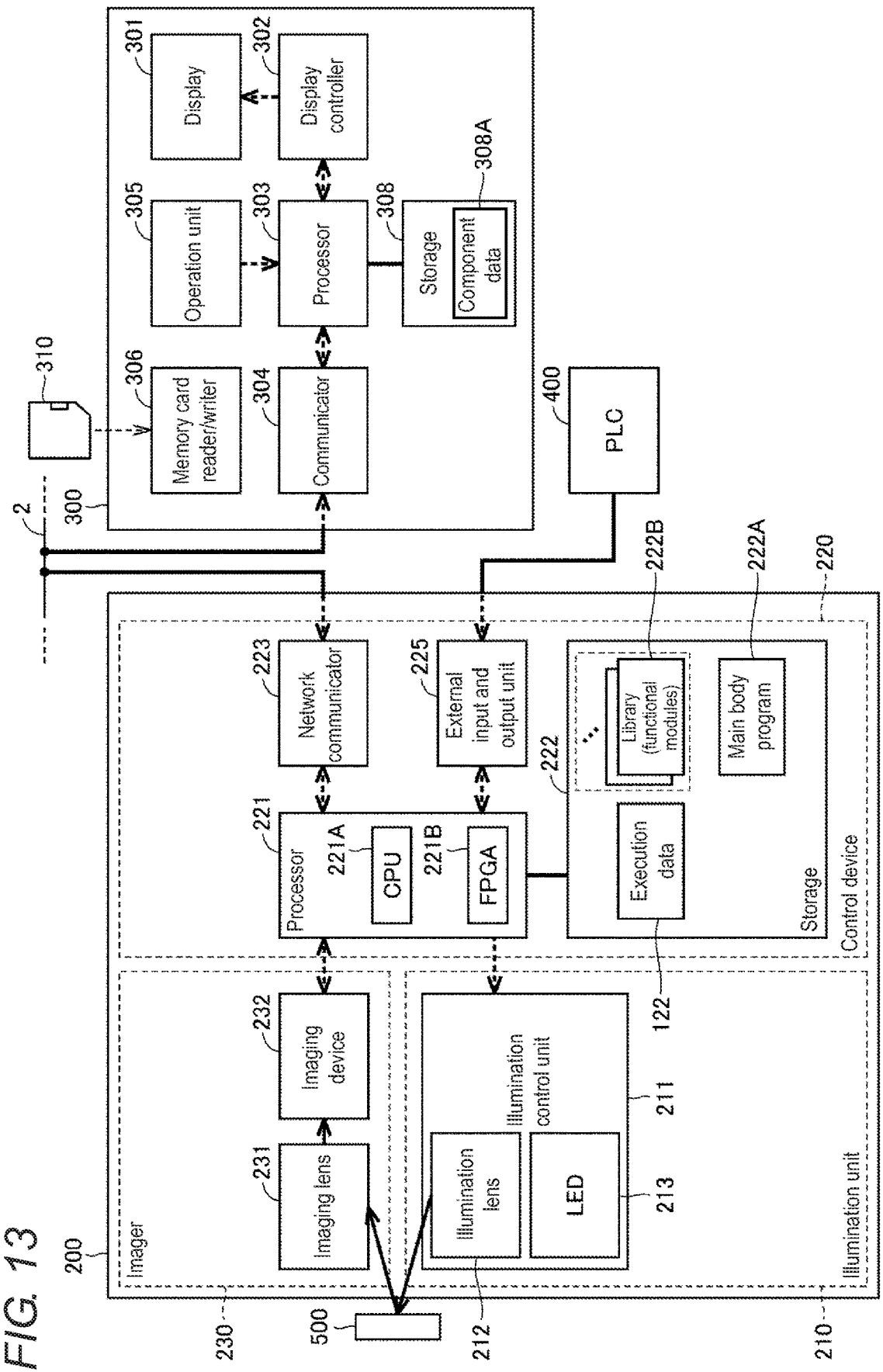
FIG. 13 is a block diagram illustrating main hardware configurations of an image processing device and a display setting unit of a first embodiment.

A configuration of each device constituting the image processing system 1 will be described with reference to FIGS. 12 and 13. FIG. 12 is a block diagram illustrating a main hardware configuration of the management device 100. FIG. 13 is a block diagram illustrating main hardware configurations of the image processing device 200 and display setting unit 300.

(E1. Management Device 100)

For example, the management device 100 is constructed with a general-purpose computer. A computer that constructs the management device 100 includes the control device 101, a memory 102, the storage device 103 such as a hard disk drive (HDD), a network interface (I/F) 104, the display 105, the operation unit 106, and a memory card reader/writer 107. These units are communicably connected to each other through an internal bus 108.

The control device 101 implements the above various functions by the expansion of the program (instruction code) stored in the storage device 103 in the memory 102. The memory 102 and the storage device 103 store data in a volatile manner and a nonvolatile manner, respectively. In addition to an operating system (OS), the storage device 103 retains an application 103A, the library 110 (see FIG. 7), and the execution time information 120 (see FIG. 8).

The application 103A is a basic program that provides the user interfaces 140 and 180 (see FIG. 6). A whole or a part of the library 110 is transmitted to the image processing device 200 in response to a user's operation. That is, a library 222B (see FIG. 13) stored in the storage device 222 of the image processing device 200 is at least a subset of the library 110 stored in the storage device 103 of the management device 100.

The network interface 104 exchanges data between the management device 100 and the image processing device 200 through the network 2 (see FIG. 1).

The display 105 displays a setting operation screen (for example, the user interfaces 140, 180) that is performed when the control device 101 executes the application 103A. The display 105 is constructed with a display such as a liquid crystal display (LCD).

The operation unit 106 receives the user's operation, and outputs an internal command indicating the received operation to the control device 101. Typically the operation unit 106 is constructed with a keyboard, a mouse, a touch panel, a tablet, and a voice recognition device.

The memory card reader/writer 107 reads the data from a memory card 107A, and writes the data in the memory card 107A. A known recording medium such as a secure digital (SD) card can be used as the memory card 107A.

(E2. Image Processing Device 200)

A device configuration of the image processing device 200 will be described below with reference to FIG. 13. The image processing device 200 includes an illumination unit 210, the control device 220, and an imager 230.

The illumination unit 210 irradiates a workpiece 500 to be an inspection target with light necessary for the imaging. That is, the illumination unit 210 irradiates an imaging range of the imager 230 with light. More specifically, the illumination unit 210 includes plural illumination control units 211 provided on an illumination board. The illumination control units 211 are disposed on the illumination board. Each of the illumination control units 211 includes an illumination lens 212 and an LED 213. The illumination control unit 211 irradiates the light in response to a command from the control device 220. More specifically, the LED 213 emits the light to the workpiece 500 through the illumination lens 212.

The imager 230 receives the light reflected from the workpiece 500 irradiated with the light by the illumination unit 210, and outputs an image signal. The image signal is transmitted to the control device 220. More specifically, the imager 230 includes an imaging device 232 that is partitioned into plural pixels of a coupled charged device (CCD) image sensor and a complementary metal oxide semiconductor (CMOS) image sensor in addition to an optical system such as an imaging lens 231.

The control device 220 controls the whole of the image processing device 200. That is, the control device 220 controls the illumination unit 210 and the imager 230, and performs the image processing based on the image signal from the imager 230. More specifically, the control device 220 includes a processor 221, the storage device 222, a network communicator 223, and an external input/output unit 225.

The processor 221 is constructed with an integrated circuit such as a CPU 121A and an FPGA 121B. Alternatively, the processor 221 may be constructed with a DSP, a GPU, an application specific integrated circuit (ASIC), or other integrated circuits.

The storage device 222 includes a nonvolatile storage device such as a read only memory (ROM), a flash memory, an HDD, and a static silicon disk (SSD), and/or a nonvolatile memory such as a random access memory (RAM). Typically, the processor 221 performs various kinds of image processing by executing a program (command code) and a module, which are stored in the storage device 222.

The program (instruction code) and the module are stored in the nonvolatile memory of the storage device 222, and the program read from the nonvolatile memory, workpiece data necessary for the execution of the program, the image data obtained by the imager 230, and the data indicating the measurement result are stored in the volatile memory of the storage device 222.

More specifically, the storage device 222 includes a main body program 222A and the library 222B including various functional modules (image processing).

The main body program 222A is a basic program implementing the basic operation of the image processing device 200, and can include the OS and a basic application. The library 222B is constructed with plural programs (typically, the command code and/or the library) implementing the image processing function provided by the image processing device 200. The libraries 222B as many as the number of image processing functions executable by the image processing device 200 are installed. As described above, the library 222B is at least a subset of the library 110 stored in the storage device 103 of the management device 100.

The network communicator 223 is an interface that exchanges the data with the management device 100 and a display setting unit 300 through the network 2. More specifically, a configuration pursuant to Ethernet (registered trademark) is adopted as the network communicator 223. The external input/output unit 225 is an interface that exchanges various pieces of data (input data and/or output data) with the PLC 400.

(E3. Display Setting Unit 300)

With reference to FIG. 13, the display setting unit 300 includes a display 301, a display controller 302, a processor 303, a communicator 304, an operation unit 305, a memory card reader/writer 306, and a storage device 308.

The display 301 displays a screen setting a parameter of the image processing executed on the image processing device 200 to be connected and a screen indicating an inspection result obtained by the execution of the image processing in the image processing device 200. Typically the display 301 is constructed with a display such as an LCD. The display controller 302 performs processing of displaying an image on the display 301 according to an instruction from the processor 303.

The processor 303 performs processing of generating an image to be displayed on the display 301 according to an instruction/command from the image processing device 200, and transmits an input value to the image processing device 200 in response to a user input through the operation unit 305.

The storage device 308 includes a nonvolatile storage device such as a ROM, a flash memory, an HDD, and an SSD, and/or a nonvolatile memory such as a RAM. The storage device 308 stores an object used in screen display as component data 308A. The processor 303 uses the component data 308A to perform the screen display.

The communicator 304 is an interface that exchanges the data with the image processing device 200.

The operation unit 305 receives the user's operation, and outputs the internal command indicating the received operation to the processor 303. The operation unit 305 typically includes a touch panel (pressure sensor), a button, and a key disposed on a surface of the display 301.

The memory card reader/writer 306 reads the data from a memory card 310, and writes the data in the memory card 310. A known recording medium such as an SD card can be used as the memory card 310.

[F. Summary of First Embodiment]

As described above, the management device 100 provides the user interface 140 that designates as the execution subject with respect to each piece of image processing included in the user setting processing flow. For example, the designatable execution subject is the CPU or FPGA of the image processing device 200. The designation of the execution subject enables the user to optimize the execution subject with respect to each piece of image processing of the user setting processing flow.

Particularly, the optimization of the execution subject is advantageous under the environment where the processing flow is set by the user. That is, when a device such as a copying machine or a television set is specified, the optimum execution subject can be previously known, and there is no need to change the execution subject. However, the image processing system 1 of a first embodiment can provide the user the environment where the processing flow can be set, and set any processing flow to various image processing devices 200. Therefore, the optimum execution subject varies depending on the type of the image processing device 200 and the content of the set processing flow.

As an example, the optimum execution subject changes according to the size of the input image. Generally, when the input image has a small size, the processing speed of the CPU is faster than the processing speed of the FPGA. On the other hand, when the input image has a large size, the processing speed of the FPGA is faster than the processing speed of the CPU. Additionally, the optimum execution subject varies depending on the type of the input image (for example, a monochrome image and a color image) and the size of a filter applied to the input image. The management device 100 of a first embodiment can designate any execution subject with respect to each piece of randomly-set image processing. The designation of the execution subject is particularly effective in mounting the FPGA having the circuit reconfiguration function.

<Second Embodiment>

[A. Outline]

In a first embodiment, the execution subject is designated with respect to each piece of image processing of the user setting processing flow, whereby the execution subject is optimized. On the other hand, an image processing system 1 according to a second embodiment optimizes not only the execution subject in the user setting processing flow, but also the execution order of each piece of image processing of the user setting processing flow.

Because the image processing system 1 of a second embodiment is identical to the image processing system 1 of the first embodiment in other points, the description will not be repeated.

[B. Functional Configuration of Management Device 100]

Figure 14:
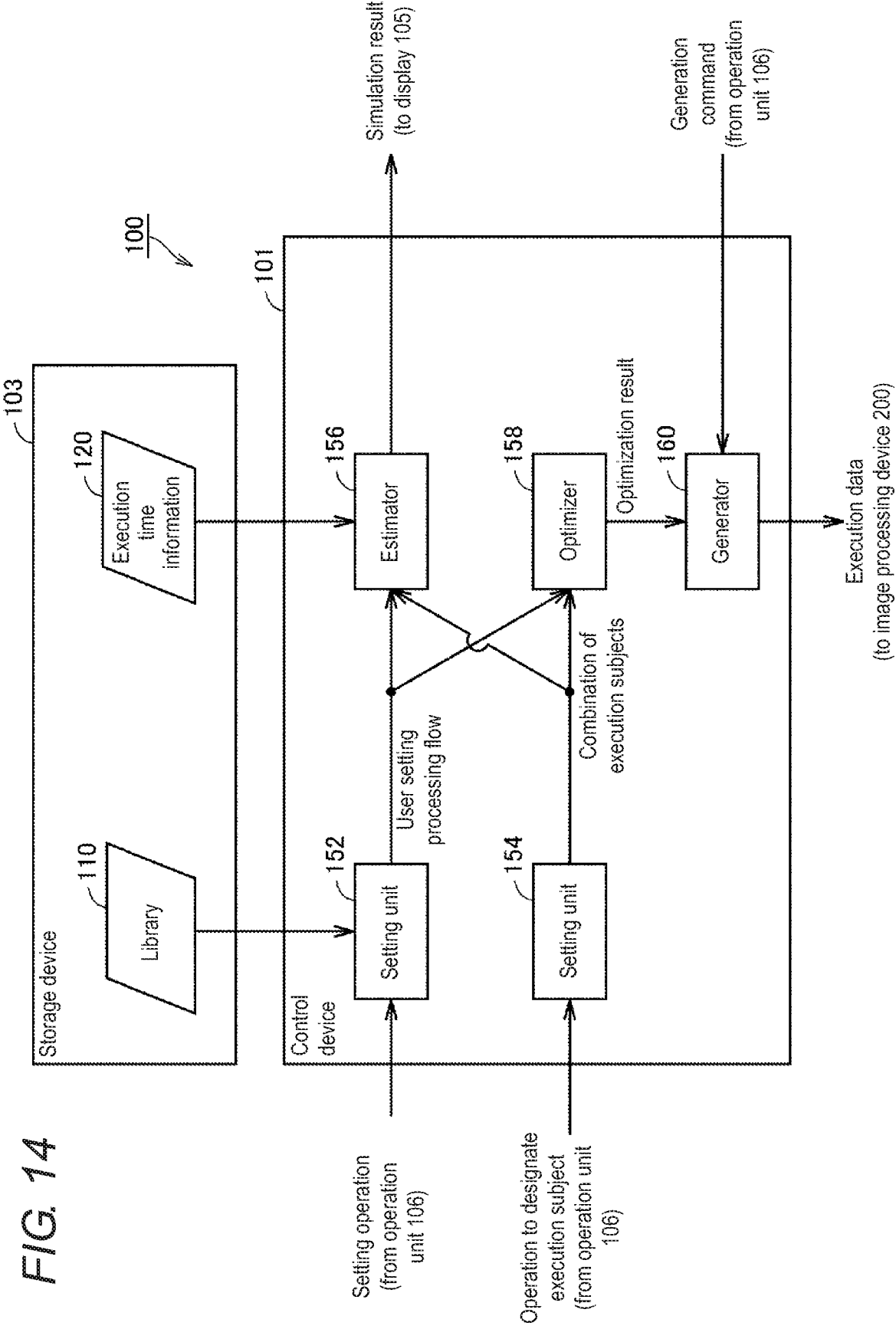
FIG. 14 is a diagram illustrating an example of a functional configuration of a management device according to a second embodiment.

A function of a management device 100 of a second embodiment will be described with reference to FIGS. 14 and 15. FIG. 14 is a diagram illustrating an example of a functional configuration of the management device 100 according to a second embodiment.

As illustrated in FIG. 14, the management device 100 includes the control device 101 and the storage device 103 as a main hardware configuration. The control device 101 includes the setting units 152 and 154, the estimator 156, an optimizer 158, and the generator 160 as a functional configuration.

Because the functional configurations except for the optimizer 158 are described above with reference to FIG. 5, the description will not be repeated.

Sometimes the output result does not change even if the execution order of the image processing is replaced. In such cases, the optimizer 158 optimizes the execution order of each piece of image processing included in the user setting processing flow such that the execution time is shortened. At this point, preferably the execution order of each piece of image processing is optimized while the combination of execution subjects set by the setting unit 152 is maintained. Alternatively, the execution subject may be designated again with respect to the processing flow in which the execution order is optimized.

As an example, a combination of pieces of image processing in which the processing time can be shortened and execution order in which the combination is optimized are previously defined. The optimizer 158 refers to the definition to specify the combination of the pieces of image processing in which the processing time can be shortened from the user setting processing flow, and optimizes the execution order of the user setting image processing according to the optimized execution order defined with respect to the combination. An optimization result is displayed on the display 105 of the management device 100.

An example of a screen on which the optimization result of the optimizer 158 is displayed will be described with reference to FIG. 15. FIG. 15 is a diagram illustrating an example of the user interface 140 that designates the execution subject.

The user interface 140 includes the user setting processing flow 111, the designation area 112 designating the execution subject for each piece of image processing included in the user setting processing flow 111, and the simulation result 113 in the case that the processing flow 111 is executed with the designated execution subject.

The user interface 140 also includes a processing flow 111C that is optimized with the execution speed prioritized, a combination 112C of the execution subject of the processing flow 111C, and a simulation result 113C in the case that the processing flow 111C is executed with the combination 112C of the execution subjects. In the example of FIG. 15, the combination 112C of the execution subjects for the processing flow 111C is identical to the combination of the execution subjects designated in the designation area 112.

The user interface 140 includes a processing flow 111D that is optimized by prioritizing the similarity of the processing flows before and after the optimization, a combination 112D of the execution subjects of the processing flow 111D, and a simulation result 113D in the case that the processing flow 111D is executed with the combination 112D of the execution subjects. In the example of FIG. 15, the combination 112D of the execution subjects for the processing flow 111D is identical to the combination of the execution subjects designated in the designation area 112.

The user interface 140 also includes a select box 117. The select box 117 receives an operation to select a specific candidate from candidates 1 to 3 in FIG. 15. When the user presses the OK button 118 while selecting the specific candidate, the management device 100 writes the processing flow, the execution order, and the combination of the execution subjects, which are indicated by the selected candidate, in the execution data 122 (see FIG. 9). When the user presses the cancel button 119, the management device 100 ends the processing without reflecting the combination of the designated execution subjects and the optimization result of the execution order.

[C. Summary of Second Embodiment]

As described above, in a second embodiment, the management device 100 optimizes not only the execution subject of the user setting processing flow, but also the execution order of the image processing in the processing flow. The execution order is optimized such that the execution time is shortened. At this time, preferably the execution order is optimized while the combination of the execution subjects designated by the user is maintained. Therefore, the management device 100 can shorten the execution time of the user setting processing flow while the execution subject is optimized.

<Third Embodiment>

[A. Outline]

In a first embodiment, the operation to designate the execution subject is performed on the select box. However, the method for designating the execution subject is not limited to the first embodiment. Other methods for designating the execution subject will be described below.

Because the image processing system 1 of the second embodiment is identical to the image processing system 1 of the first embodiment in other points, the description will not be repeated.

[B. User Interface Setting Execution Subject]

Figure 16:
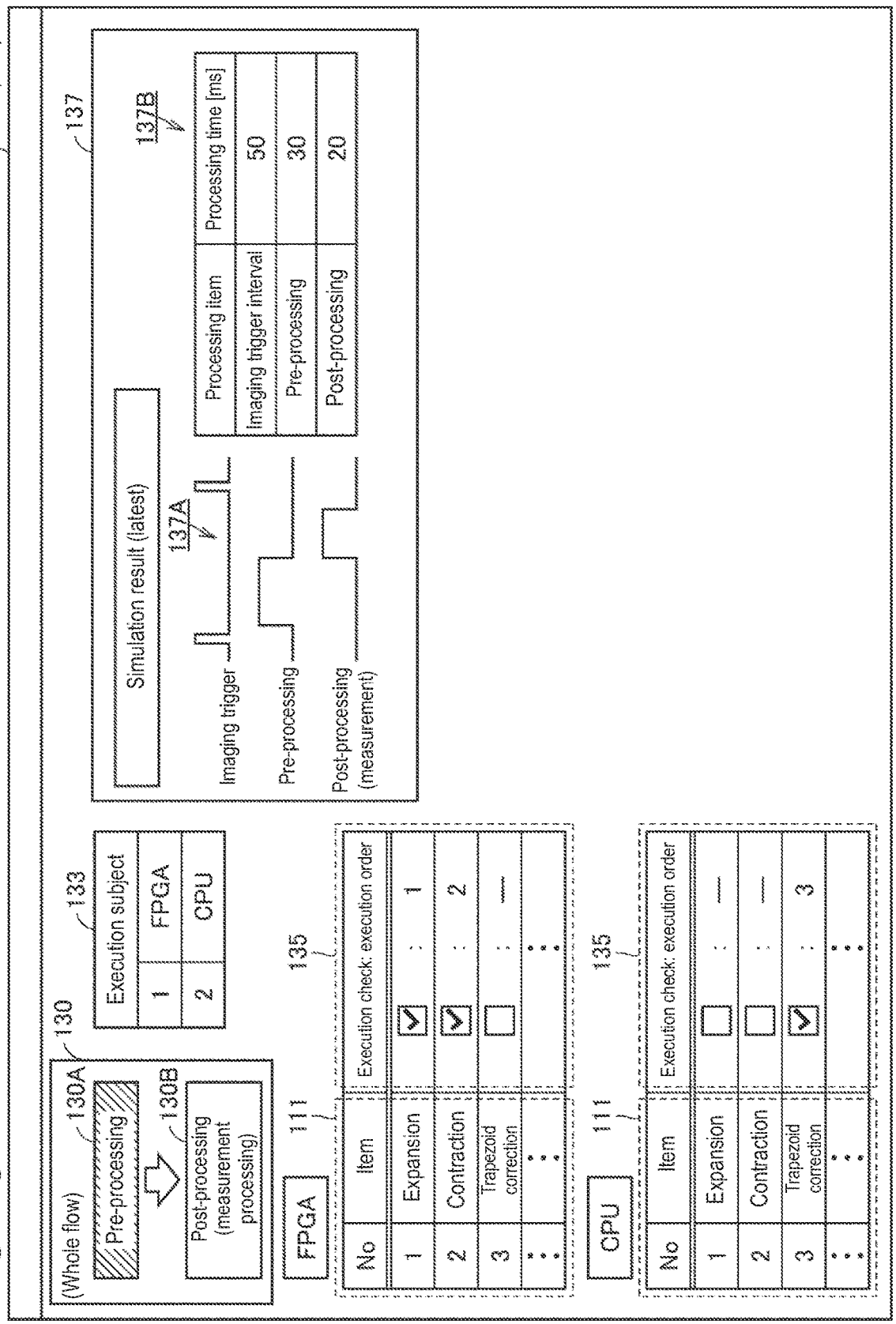
FIG. 16 is a diagram illustrating an example of a user interface that designates an execution subject.

FIG. 16 is a diagram illustrating an example of a user interface 140A that designates the execution subject.

The user interface 140A includes a whole processing flow 130. The whole processing flow 130 includes items 130A and 1306 representing a processing content. The user can select one of the items 130A and 1306. The management device 100 displays the processing flow set in the selected item based on the selection of one of the items 130A and 1306. In the example of FIG. 16, the item 130A representing pre-processing is selected, and the processing flow 111 representing the pre-processing is displayed.

The user interface 140A displays execution subject information 133 representing the type of the control device installed in the image processing device 200. In the example of FIG. 16, the CPU and the FPGA are illustrated as the execution subject information 133.

The user interface 140A also includes a designation area 135 designating the execution subject with respect to each piece of image processing included in the processing flow 111. In the example of FIG. 16, the check boxes are illustrated in the designation area 135. Each select box is displayed in parallel with a corresponding image processing item in the processing flow 111. The check box is displayed by the execution subject. The user can designate one execution subject with respect to each piece of image processing included in the processing flow 111.

For example, in the case that the check box of an item "expansion" in an execution subject "FPGA" is selected, a check mark is added to the check box. At this point, the check mark is deleted in the check box of the item "expansion" in an execution subject "CPU". Thus, only one execution subject can be designated for one piece of image processing. For the selected check box, the execution order is displayed.

The user interface 140A displays a simulation result 137 in the case that the processing flow 111 is executed with the combination of the execution subjects designated in the designation area 135. The simulation result 137 includes a timing chart 137A representing timing in which each piece of processing in the whole processing flow 130 is executed and a processing time 1376 of each piece of processing.

[C. Modification]

Figure 17:
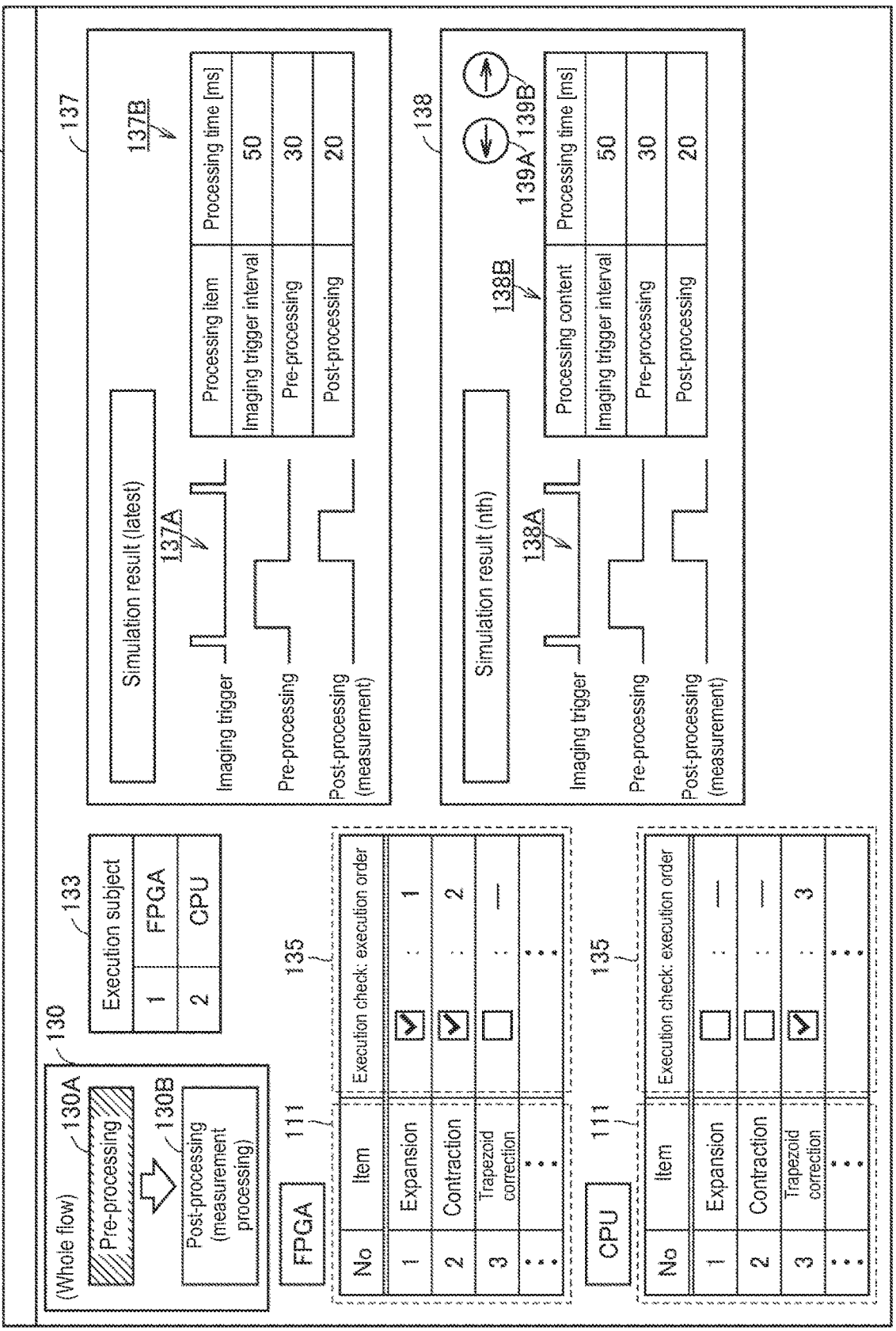
FIG. 17 is a diagram illustrating a modification of a user interface that designates an execution subject.

A modification of the user interface 140A in FIG. 16 will be described with reference to FIG. 17. FIG. 17 is a diagram illustrating a modification of the user interface 140A. In FIG. 17, a user interface 140B is illustrated as a modification.

The latest simulation result 137 and a past simulation result 138 are displayed side by side on the user interface 140B. That is, in the modification, the past simulation result is stored as a history, and the user can display the simulation result at any point of time. As an example, the simulation result preceding to the simulation result 138 can be displayed when the user presses a button 139A. The simulation result subsequent to the simulation result 138 can be displayed when the user presses a button 1396.

The simulation result 138 to be compared includes a timing chart 138A representing timing each piece of processing in the whole processing flow 130 is executed and a processing time 1386 of each piece of the processing. When the latest simulation result 137 and the past simulation result 138 are displayed side by side, the user can check the validity of the combination of the designated execution subjects.

The disclosed embodiments are illustrative in all respects, but are not restrictive. The scope of the present invention is indicated by not the above description but the claims, and it is intended that the meanings equivalent to the claims and all the changes within the scope of the present invention are included in the scope of the present invention.

The invention claimed is:

1. An image processing system comprising:
a first control device;
a second control device having a type different from the first control device;
a storage in which a library comprising a plurality of pieces of image processing executed by the first control device or the second control device is stored;
a processor configured with a program to perform operations comprising:
operation as an operation unit configured to:
receive an operation to select at least one piece of image processing from the library;
receive an operation to designate an execution order with respect to each selected piece of image processing; and
receive an operation to designate one of the first control device and the second control device as an execution subject with respect to each selected piece of image processing; and
operation as an estimator configured to estimate an execution time when each selected piece of image processing is processed with the respective designated execution subjects, the estimated execution time based on execution time information stored in the storage defining an execution time by the first control device or the second control device for each of the plurality of pieces of image processing; and
a display configured to display each piece of the selected image processing in the execution order and the estimated execution time.

2. The image processing system according to claim 1, wherein the library comprises a first image processing group to be executed by the first control device and a second image processing group to be executed by the second control device, a processing content of the second image processing group being identical to each piece of image processing of the first image processing group.

3. The image processing system according to claim 1, wherein:

the processor is configured with the program to perform operations such that operation as the estimator comprises operation as the estimator that estimates the execution time every time the designation of the execution subject is changed; and
the display updates the display of the execution time in conjunction with the operation to designate the execution subject.

4. The image processing system according to claim 1, wherein one of the first control device and the second control device comprises a field programmable gate array (FPGA), and the display further displays a number of times of circuit reconfiguration generated in the FPGA when each piece of selection target image processing is executed by the designated execution subject in the execution order.

5. The image processing system according to claim 1, wherein the processor is configured with the program to perform operations further comprising operation as an optimizer configured to optimize the execution order of each selected piece of image processing while the designation of the execution subjects is maintained.

6. The image processing system according to claim 1, wherein:

the processor is configured with the program to perform operations such that operation as the estimator comprises operation as the estimator that estimates the execution time every time the designation of the execution subject is changed; and
the display updates the display of the execution time in conjunction with the operation to designate the execution subject.

7. An information processing device configured to be communicable with an image processing device comprising a first control device and a second control device having a type different from the first control device, the information processing device comprising:

a storage in which a library comprising a plurality of pieces of image processing executed by the first control device or the second control device is stored;
a processor configured with a program to perform operations comprising operation as an operation unit configured to:
receive an operation to select at least one piece of image processing from the library;
receive an operation to designate an execution order with respect to each selected piece of image processing; and
receive an operation to designate one of the first control device and the second control device as an execution subject with respect to each selected piece of image processing; and
operation as an estimator configured to estimate an execution time when each selected piece of image processing is processed with the respective designated execution subjects, the estimated execution time based on execution time information stored in the storage defining an execution time by the first control device or the second control device for each of the plurality of pieces of image processing; and
a display configured to display each piece of the selected image processing in the execution order and the execution time.

8. An information processing method comprising:
preparing a library comprising a plurality of pieces of image processing executed by a first control device or a second control device having a type different from the first control device;

receiving an operation to select at least one piece of image processing from the library;

receiving an operation to designate an execution order with respect to each selected piece of image processing;

receiving an operation to designate one of the first control device and the second control device as an execution subject with respect to each selected piece of image processing;

estimating an execution time when each selected piece of image processing is processed with the respective designated execution subjects, the estimated execution time based on execution time information defining an execution time by the first control device or the second control device for each of the plurality of pieces of image processing; and displaying each selected piece of image processing in the execution order and the execution time.

9. The information processing method according to claim 8, wherein the library comprises a first image processing group to be executed by the first control device and a second image processing group to be executed by the second control device, a processing content of the second image processing group being identical to each piece of image processing of the first image processing group.

10. The information processing method according to claim 8, further comprising:

estimating the execution time every time the designation of the execution subject is changed; and updating the display of the execution time in conjunction with the operation to designate the execution subject.

11. The information processing method according to claim 8, wherein one of the first control device and the second control device comprises a field programmable gate array (FPGA), and the information processing method further comprised displaying a number of times of circuit reconfiguration generated in the FPGA when each piece of selection target image processing is executed by the designated execution subject in the execution order.

12. The information processing method according to claim 8, further comprising optimizing the execution order of each selected piece of image processing while the designation of the execution subjects is maintained.

13. A non-transitory computer-readable storage medium storing an information processing program executed by a processor of an image processing device, the information processing program causing the processor of the image processing device perform operations comprising:

preparing a library comprising a plurality of pieces of image processing executed by a first control device or a second control device having a type different from the first control device;

receiving an operation to select at least one piece of image processing from the library;

receiving an operation to designate an execution order with respect to each selected piece of image processing;

receiving an operation to designate one of the first control device and the second control device as an execution subject with respect to each selected piece of image processing;

estimating an execution time when each selected piece of image processing is processed with the respective designated execution subjects, the estimated execution time based on execution time information stored in the storage defining an execution time by the first control device or the second control device for each of the plurality of pieces of image processing; and displaying each selected piece of image processing in the execution order and the execution time.

\* \* \* \* \*